United States Patent
Yang et al.

(10) Patent No.: US 12,321,631 B2
(45) Date of Patent: **\*Jun. 3, 2025**

(54) SUSPENSION DURING A MULTI-PLANE WRITE PROCEDURE

(71) Applicant: Micron Technology, Inc., Boise, ID (US)

(72) Inventors: Caixia Yang, Boise, ID (US); Deping He, Boise, ID (US)

(73) Assignee: Micron Technology, Inc., Boise, ID (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/417,808

(22) Filed: Jan. 19, 2024

(65) Prior Publication Data

US 2024/0241663 A1 Jul. 18, 2024

Related U.S. Application Data

(63) Continuation of application No. 17/654,552, filed on Mar. 11, 2022, now Pat. No. 11,899,963.

(51) Int. Cl.
*G06F 3/06* (2006.01)

(52) U.S. Cl.
CPC .......... *G06F 3/0655* (2013.01); *G06F 3/0604* (2013.01); *G06F 3/0676* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 9,595,343 B1 | 3/2017 | Srinivasan et al. | |
| 11,194,511 B2 | 12/2021 | Palmer | |
| 2021/0081132 A1* | 3/2021 | Smith | G06F 3/0653 |
| 2022/0121391 A1* | 4/2022 | Siripragada | G06F 3/064 |
| 2022/0291836 A1* | 9/2022 | Tran | G06F 3/0626 |
| 2023/0028627 A1 | 1/2023 | Bhardwaj | |

\* cited by examiner

*Primary Examiner* — Edward J Dudek, Jr.
*Assistant Examiner* — Ralph A Verderamo, III
(74) *Attorney, Agent, or Firm* — Holland & Hart LLP

(57) ABSTRACT

Methods, systems, and devices for suspension during a multi-plane write procedure are described. A memory system may perform a multi-plane write procedure by writing to a set of planes in parallel. Upon detecting a defective plane in the set of planes, the memory system may suspend writing to the defective plane until writing to the other planes in the set of planes is finished. The memory system may then resume writing to the defective plane.

20 Claims, 9 Drawing Sheets

SUSPENSION DURING A MULTI-PLANE WRITE PROCEDURE

CROSS REFERENCE

The present application for patent is a continuation of U.S. patent application Ser. No. 17/654,552 by Yang et al., entitled "SUSPENSION DURING A MULTI-PLANE WRITE PROCEDURE," filed Mar. 11, 2022, assigned to the assignee hereof, and is expressly incorporated by reference in its entirety herein.

FIELD OF TECHNOLOGY

The following relates to one or more systems for memory, including suspension during a multi-plane write procedure.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

A memory system may perform a multi-plane write procedure in which the memory system writes data in parallel (e.g., concurrently, at partially or wholly overlapping times) to multiple planes. For example, upon receipt of data for storage, the memory system may write the data to a set of planes by performing various write operations on the set of planes in parallel. But in some cases, one or more of the planes in the set of planes may be defective. For example, one or more of the planes may have an issue that causes repeated write operations for the data such as one or more subsets of data, which in turn may slow down the write latency of the one or more planes (where the write latency refers to the amount of time it takes to write a unit of data (e.g., 4 kB) to the plane), which may increase the amount of time it takes to write the unit of data to the plane. But performing repeated write operations on one or more defective planes may negatively impact other planes in the set of planes, which may result in errors in the data stored in the other planes, among other drawbacks.

According to the techniques described herein, a memory system may improve performance by suspending one or more defective planes during a multi-plane write procedure, where suspending a plane may refer to suspending writing to that plane. For example, after determining a set of memory planes to which to write data (e.g., in parallel), the memory system may begin writing subsets of the data to the set of memory planes (e.g., by writing to the memory planes in parallel). If the memory system detects one or more defective planes during the writing, the memory system may suspend one or more write operations to the one or more defective planes until the data for the other memory planes has been written. The memory system may then resume write operations to the one or more defective memory planes. Thus, the memory system may avoid disturbing or otherwise affecting the other memory planes involved in the multi-plane write procedure by strategically suspending write operations to the one or more defective memory planes.

Figure 1:
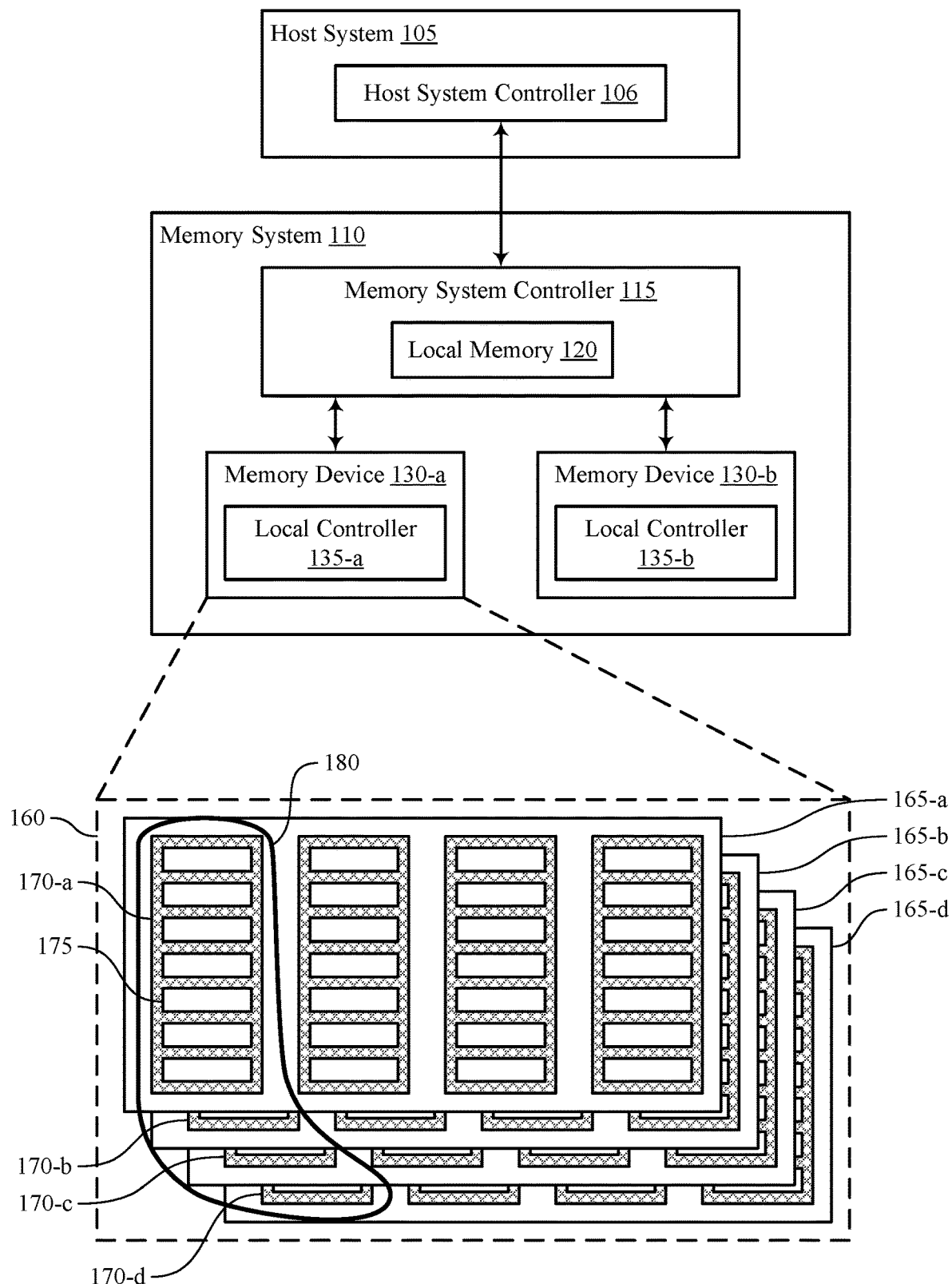
FIG. 1 illustrates an example of a system that supports suspension during a multi-plane write procedure in accordance with examples as disclosed herein.
Figure 2:
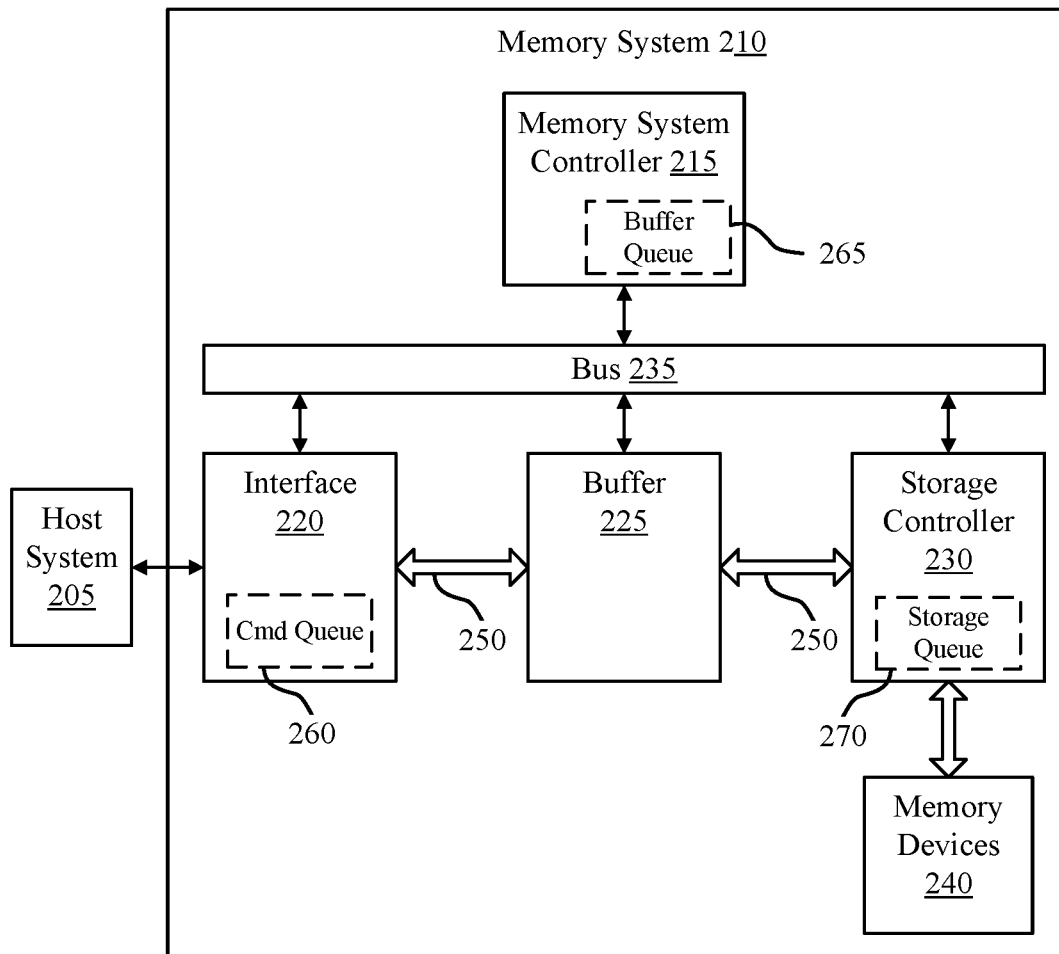
FIG. 2 illustrates an example of a system that supports suspension during a multi-plane write procedure in accordance with examples as disclosed herein.

Features of the disclosure are initially described in the context of systems, devices, and circuits with reference to FIGS. 1 through 2. Features of the disclosure are described in the context of planes and process flows with reference to FIGS. 3-5. These and other features of the disclosure are further illustrated by and described in the context of apparatus diagrams and flowcharts that relate to suspension during a multi-plane write procedure with reference to FIGS. 6-9.

FIG. 1 illustrates an example of a system 100 that supports suspension during a multi-plane write procedure in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

The system 100 may include any quantity of non-transitory computer readable media that support suspension during a multi-plane write procedure. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some examples, a memory system may improve performance (e.g., increase storage speed) by writing data to multiple memory planes in parallel (e.g., concurrently, at partially or wholly overlapping times) during a multi-plane write procedure. But the multi-plane write procedure may be negatively impacted if one or more of the memory planes is defective (e.g., has an issue that causes repeat write operations in order to successfully store data). For example, a defective plane that undergoes repetitive write operations (e.g., due to failed write operations) may negatively affect (e.g., cause errors in) the other memory planes that are involved in the multi-plane write procedure. A write procedure may refer to the collection of operations, including write operations, used to write a set of data to a memory device. So, a multi-plane write procedure may include the write operations for each plane involved in the multi-plane write procedure.

Some memory systems may use a memory array, such as an SRAM array, to store information (e.g., duplicate data and parity bits) that the memory system can use to correct errors that arise (e.g., due to a defective memory plane) during a multi-plane write procedure. But storing information to correct errors caused by a defective memory plane may waste memory space and, as multi-plane write procedures scale to include more memory planes, may become impractical and costly. According to the techniques described herein, the memory system 110 may prevent issues caused by one or more defective memory plane(s) during a multi-plane write procedure by suspending one or more write operations to the one or more defective memory planes during the multi-plane write procedure.

FIG. 2 illustrates an example of a system 200 that supports suspension during a multi-plane write procedure in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on (e.g., in response to) the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, if the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

In some examples, the memory system 210 may be configured to decrease latency by performing multi-plane write procedures in which data for a set of planes is written to the set of planes in parallel. To prevent disturbing or otherwise negatively affecting the write operations on non-defective planes in the set of planes, the memory system 210 may suspend one or more write operations to any defective planes that are detected during the multi-plane write procedure. A non-defective plane may refer to a plane that has a write latency less than a threshold latency. After the data for the non-defective planes has been written to the non-defective planes, the memory system 210 may resume write operations to the defective plane(s) until the data for the defective plane(s) is written to the defective planes (e.g., planes that have a write latency greater than a threshold latency).

Figure 3:
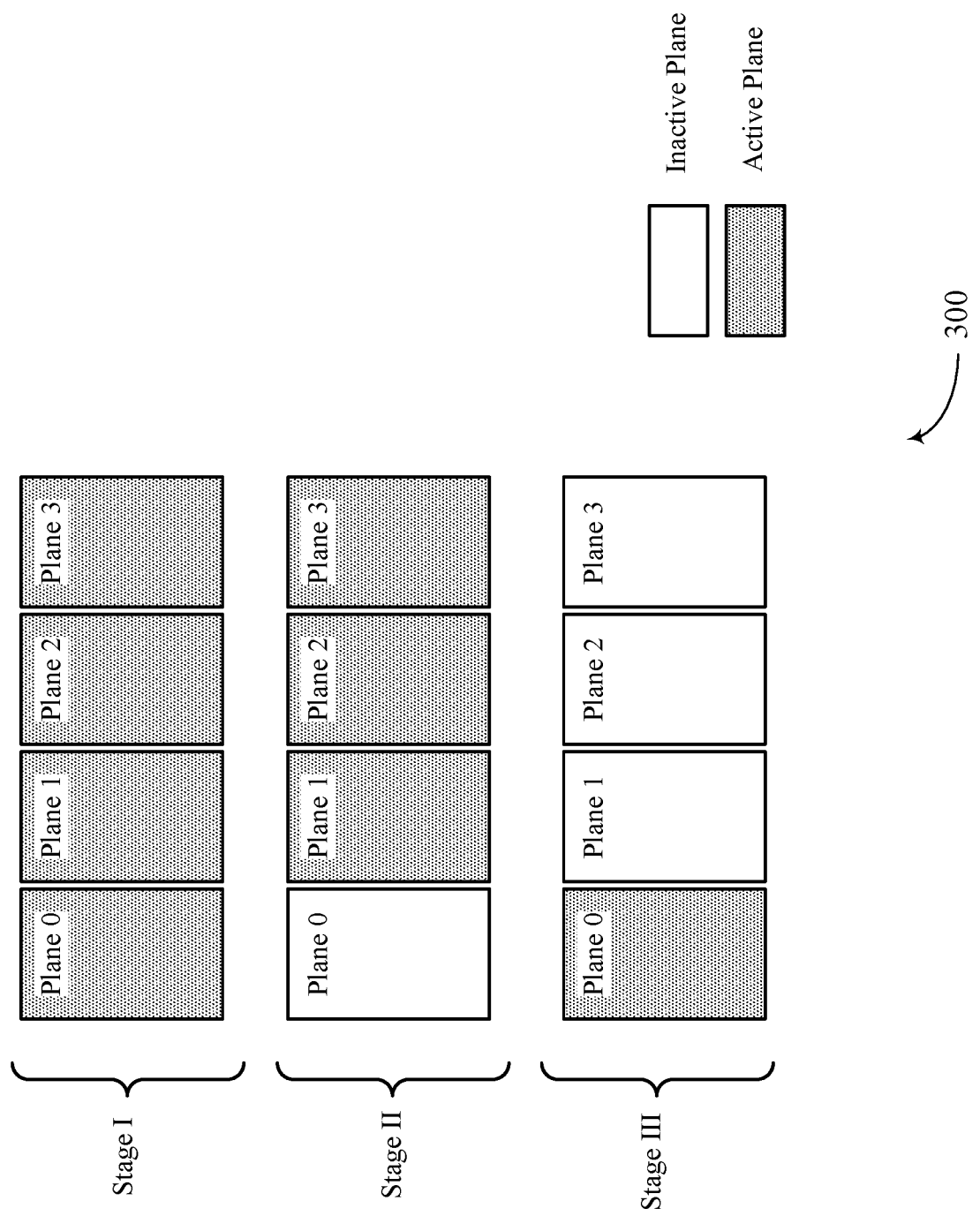
FIG. 3 illustrates an example of planes that support suspension during a multi-plane write procedure in accordance with examples as disclosed herein.

FIG. 3 illustrates an example of planes 300 that support suspension during a multi-plane write procedure in accordance with examples as disclosed herein. The planes 300 may include plane 0, plane 1, plane 2, and plane 3. The planes 300 may be included in one or more blocks of a memory device or a memory system as describe herein. The planes 300 may be similar to the planes 400 described with reference to FIG. 4, but may include a single defective plane as opposed to the multiple defective planes described with reference to FIG. 4. The memory system that includes the planes 300 may detect the defective plane and suspend write operations to the defective plane as described herein. In FIG. 3, active memory planes are shown shaded white (where active memory planes refer to memory planes undergoing write operations for a multi-plane write procedure) and inactive memory planes are shown shaded grey (where inactive memory planes refer to memory planes not undergoing write operations for a multi-plane write procedure).

The memory system that includes the planes 300 may receive data (e.g., from a host system) that the memory system is to write to memory. In response to receiving the data, the memory system may select a plurality of planes (e.g., plane 0, plane 1, plane 2, and plane 3) for storing the data. In some examples, the plurality of planes selected by the memory system may be associated with the data (e.g., the plurality of planes may be indicated by one or more write commands corresponding to the data). The memory system may also partition the data into subsets of data and assign each subset of data or one or more subsets of data to one or more of the respective planes 300. So, each plane of the planes 300 may have one or more subsets or multiple subsets of data assigned to it for a multi-plane write procedure.

After selecting the plurality of planes and assigning the subsets of data to the plurality of planes, the memory system may begin the multi-plane write procedure. In stage I of the multi-plane write procedure, the memory system may write some of the subsets of data to the planes 300. The subsets of data may be written to all of the planes 300 in parallel. For example, the memory system may concurrently perform: one or more write operations on plane 0 to write a first subset of data to plane 1, one or more write operations on plane 1 to write a second subset of data to plane 1, one or more write operations on plane 2 to write a third subset of data to plane 2, and one or more write operations on plane 3 to write a fourth subset of data to plane 3. Thus, each plane may be active during stage I of the multi-plane write procedure. The memory system may perform multiple rounds of parallel write operations during stage I, working through at least some of the subsets of data for each plane.

During stage I, the memory system may determine the write latency of one or more of the planes 300. For example, the memory system may determine the write latency for plane 0, plane 1, plane 2, or plane 3, or any combination thereof. The memory system may determine the write latency for a plane based on the amount of time it takes to successfully write a unit of data (e.g., n subsets of data) to the plane. Additionally or alternatively, the memory system may determine the write latency for a plane based on the quantity of failed write operations for a unit of data, based on the quantity of repeated write operations needed to write the unit of data, or both.

If the memory system determines that the write latency for a plane is greater than a threshold latency, the memory system may identify the plane as a defective plane and suspend write operations to that plane while continuing the write operations for the other (e.g., non-defective) planes, which may be referred to as the remainder planes. The threshold latency may be preconfigured at the memory system (e.g., the threshold latency may have a predetermined value that is independent of the determined write latencies of the planes 300) or the threshold latency may be dynamically determined (e.g., the value of the threshold latency may be based on one or more of the determined write latencies for the planes 300).

In example of FIG. 3, the memory system may identify a plane, such as plane 0, as a defective plane based on plane 0 having a write latency that is greater than the threshold latency. After determining that plane 0 is defective, the memory system may suspend write operations to plane 0 and enter stage II of the multi-plane write procedure.

In stage II of the multi-plane write procedure, the memory system may write additional subsets of data to the remainder (e.g., non-defective) planes in parallel. For example, the memory system may concurrently perform: one or more write operations on plane 1 to write additional subset(s) of data to plane 1, one or more write operations on plane 2 to write additional subset(s) of data to plane 2, and one or more write operations on plane 3 to write additional subsets of data to plane 3. The memory system may perform one or more rounds of parallel write operations during stage II, writing the remaining subsets of data for plane 1, plane 2, and plane 3. However, the memory system may refrain from writing to plane 0 the remaining subsets of data for plane 0, which may allow the write operations to planes 1 through 3 to occur without disruption from defective plane 0. So, in stage II of the multi-plane write procedure plane 0 may be inactive and planes 1 through 3 may be active.

After the remaining subsets of data for planes 1 through 3 have been written to planes 1 through 3, the memory system may resume write operations for plane 0. For example, the memory system may write to plane 0 the remaining subsets of data for plane 0. Because all the data for planes 1 through 3 has already been written to planes 0 through 3 (e.g., during stage I and stage II), the memory system may not perform any write operations (at least for the multi-plane write procedure) to planes 1 through 3 during stage III. So, in stage III of the multi-plane write procedure plane 0 may be active and planes 1 through 3 may be inactive.

Thus, the memory system may detect and suspend a defective plane during a multi-plane write procedure and in doing so may improve the reliability of the multi-plane write procedure.

Figure 4:
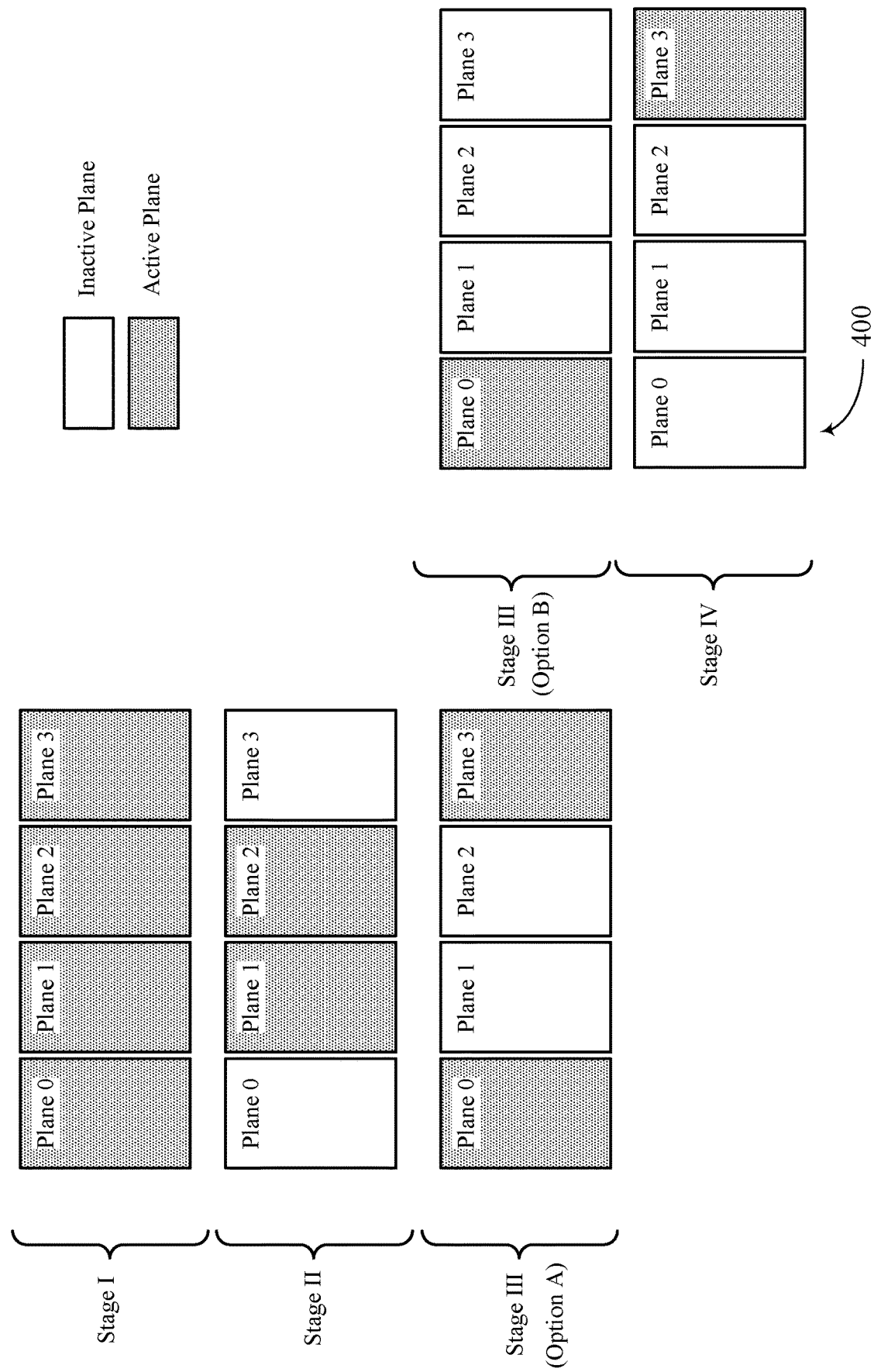
FIG. 4 illustrates an example of planes that support suspension during a multi-plane write procedure in accordance with examples as disclosed herein.

FIG. 4 illustrates an example of planes 400 that support suspension during a multi-plane write procedure in accordance with examples as disclosed herein. The planes 400 may include plane 0, plane 1, plane 2, and plane 3. The planes 400 may be included in one or more blocks of a memory device or a memory system as describe herein. The planes 400 may be similar to the planes 300 described with reference to FIG. 3 but may include multiple defective planes as opposed to a single defective plane. The memory system that includes the planes 400 may detect the defective planes and suspend write operations to the defective planes as described herein. In FIG. 4, active memory planes are shown shaded white (where active memory planes refer to memory planes undergoing write operations for a multi-plane write procedure) and inactive memory planes are shown shaded grey (where inactive memory planes refer to memory planes not undergoing write operations for a multi-plane write procedure).

The memory system that includes the planes 400 may receive data (e.g., from a host system) that the memory system is to write to memory. In response to receiving the data, the memory system may select a plurality of planes (e.g., plane 0, plane 1, plane 2, and plane 3) for storing the data. In some examples, the plurality of planes selected by the memory system may be associated with the data (e.g., the plurality of planes may be indicated by one or more write commands corresponding to the data). The memory system may also partition the data into subsets of data and assign each subset of data to one or more of the planes 400. So, each plane of the planes 400 may have multiple subsets of data assigned to it for a multi-plane write operation.

After selecting the plurality of planes and assigning the subsets of data to the plurality of planes, the memory system may begin the multi-plane write procedure. In stage I of the multi-plane write procedure, the memory system may write some of the subsets of data to the planes 400. The subsets of data may be written to all of the planes 400 in parallel. For example, the memory system may concurrently perform: one or more write operations on plane 0 to write a first subset of data to plane 1, one or more write operations on plane 1 to write a second subset of data to plane 1, one or more write operations on plane 2 to write a third subset of data to plane 2, and one or more write operations on plane 3 to write a fourth subset of data to plane 3. Thus, each plane may be active during stage I of the multi-plane write procedure. The memory system may perform multiple rounds of parallel write operations during stage I, working through at least some of the subsets of data for each plane.

During stage I, the memory system may determine the write latency of one or more of the planes 400. For example, the memory system may determine the write latency for plane 0, plane 1, plane 2, or plane 3, or any combination thereof. The memory system may determine the write latency for a plane based on the amount of time it takes to successfully write a unit of data (e.g., n subsets of data) to the plane. Additionally or alternatively, the memory system may determine the write latency for a plane based on the quantity of failed write operations for a unit of data, based on the quantity of repeated write operations needed to write the unit of data, other information, or some combination.

If the memory system determines that the write latency for a plane is greater than a threshold latency, the memory system may identify the plane as a defective plane and suspend write operations to that plane while continuing the write operations for the other (e.g., non-defective) planes, which may be referred to as the remainder planes. The threshold latency may be, in some examples, preconfigured at the memory system (e.g., the threshold latency may have a predetermined value that is independent of the determined write latencies of the planes 400) or the threshold latency may be, in some examples, dynamically determined (e.g., the value of the threshold latency may be based on one or more of the determined write latencies for the planes 400).

In the example of FIG. 4, the memory system may identify plane 0 and plane 3 as defective planes based on plane 0 and plane 3 each having a write latency that is greater than the threshold latency. After determining that plane 0 and plane 3 are defective, the memory system may suspend write operations to plane 0 and plane 3 and may enter stage II of the multi-plane write procedure.

In stage II of the multi-plane write procedure, the memory system may write additional subsets of data to the remainder (e.g., non-defective) planes in parallel. For example, the memory system may concurrently perform: one or more write operations on plane 1 to write additional subset(s) of data to plane 1, and one or more write operations on plane 2 to write additional subset(s) of data to plane 2. The memory system may perform one or more rounds of parallel write operations during stage II, writing the remaining subsets of data for plane 1 and plane 2. However, the memory system may refrain from writing to the defective planes (e.g., plane 0 and plane 3) the remaining subsets of data for the defective planes, which may allow the write operations to plane 1 and plane 2 to occur without disruption from the defective planes. So, in stage II of the multi-plane write procedure plane 0 and plane 3 may be inactive and plane 1 and plane 2 may be active.

After the remaining subsets of data for plane 1 and plane 2 have been written to plane 1 and plane 2, the memory system may resume write operations for plane 0, plane 3, or both, in stage III.

In a first option, Option A, the memory system may resume write operations to both plane 0 and plane 3. For example, the memory system may write to plane 0 the remaining subsets of data for plane 0 and in parallel may write to plane 3 the remaining subsets of data for plane 3. The memory system may select Option A for stage III based on the severity of the defectiveness of planes 0 and plane 3. For instance, the memory system may selection Option A if plane 0 and plane 3 have write latencies that are greater than the threshold latency but less than a second threshold latency that is greater than the threshold latency (indicating that plane 0 and plane 3 are moderately defective, as opposed to severely defective). Because all the data for plane 1 plane 2 has already been written to plane 1 and plane 2 (e.g., during stage I and stage II), the memory system may not perform any write operations (at least for the multi-plane write procedure) to plane 1 or plane 2 during stage III. So, in Option A of the multi-plane write procedure, plane 0 and plane 3 may be active during stage III and plane 1 and plane 2 may be inactive. Option A may be faster, but less reliable, relative to Option B.

In a second option, Option B, the memory system may resume write operations to either plane 0 or plane 3, but not both. For example, the memory system may write to plane 0 the remaining subsets of data for plane 0 and may refrain from writing to plane 3 the remaining subsets of data for plane 3. The memory system may select Option B for stage III based on the severity of the defectiveness of planes 0 and plane 3. For instance, the memory system may select Option B for stage III if plane 0 and plane 3 have write latencies that are greater than both the threshold latency and a second threshold latency that is greater than the threshold latency (indicating that plane 0 and plane 3 are severely defective, as opposed to moderately defective). Because all the data for plane 1 plane 2 has already been written to plane 1 and plane 2 (e.g., during stage I and stage II), the memory system may not perform any write operations (at least for the multi-plane write procedure) to plane 1 or plane 2 during stage III. So, in Option B of the multi-plane write procedure, plane 0 may be active during stage III and plane 1, plane 2, and plane 3 may be inactive.

To finish the multi-plane write procedure in Option B, the memory system may proceed to stage IV and resume write operations to plane 3 (e.g., after writing to plane 0 the remaining subsets of data for plane 0). For example, the memory system may write to plane 3 the remaining subsets of data for plane 3. Because all the data for plane 0, plane 1, and plane 2 has already been written to plane 0, plane 1, and plane 2 (e.g., during stages I through III), the memory system may not perform any write operations (at least for the multi-plane write procedure) to plane 0, plane 1, or plane 2 during stage IV. So, in Option B of the multi-plane write procedure, plane 3 may be active during stage IV and plane 0, plane 1, and plane 2 may be inactive. Performing write operations to plane 0 and plane 3 in series (as described in Option B) may prevent one or both of the defective planes from interfering with the other during writing. Option B may be more reliable, but slower, relative to Option A.

In some examples, the memory system may select between Option A or Option B based on the data to be written to the planes 300. For example, the memory system may select Option A if the data is error-tolerant and/or latency intolerant and may select Option B is the data is latency tolerant and/or error-intolerant.

Thus, the memory system may detect and suspend multiple defective planes during a multi-plane write procedure and in doing so may improve the reliability of the multi-plane write procedure.

Figure 5:
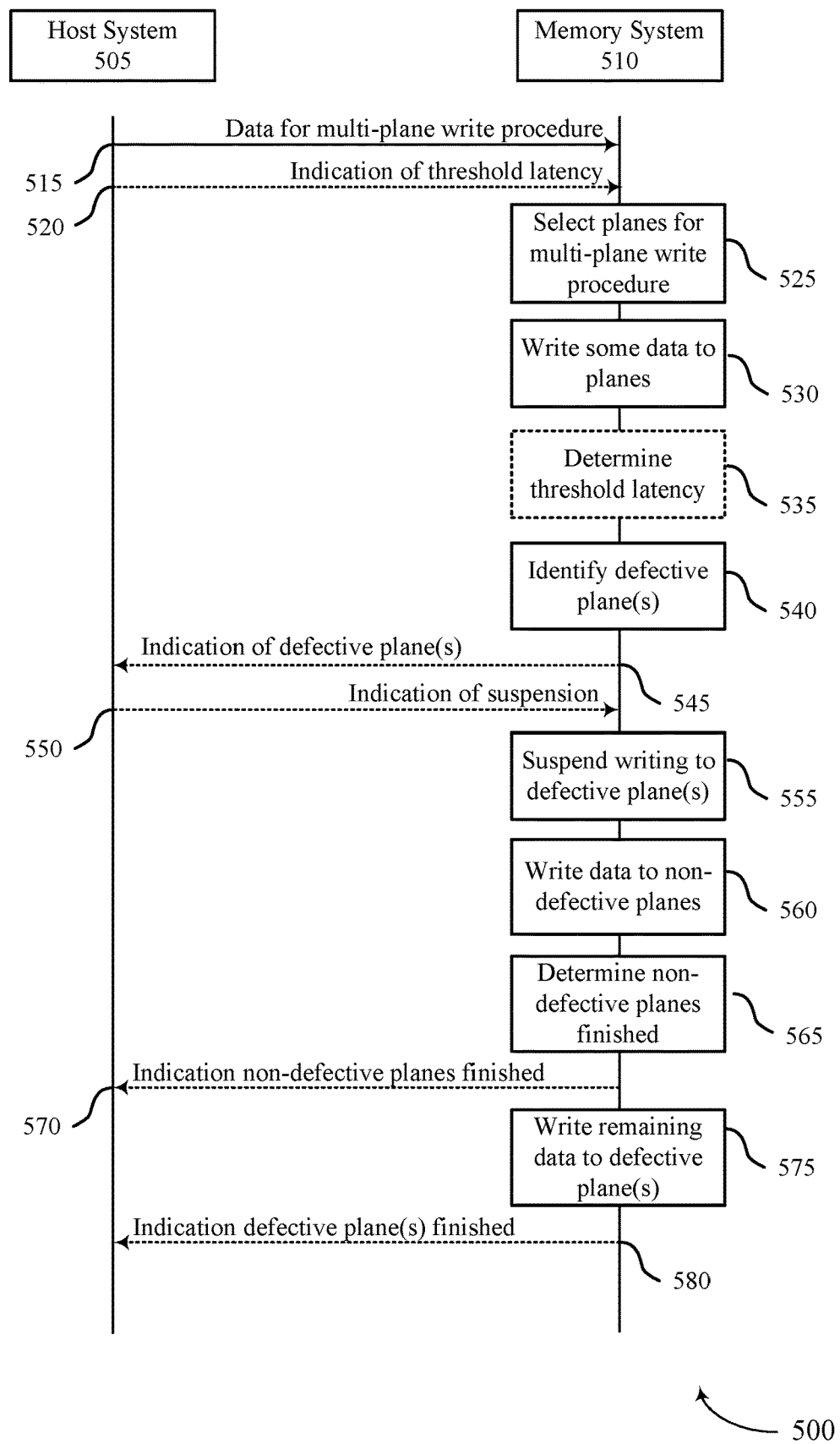
FIG. 5 illustrates an example of a process flow that supports suspension during a multi-plane write procedure in accordance with examples as disclosed herein.

FIG. 5 illustrates an example of a process flow 500 that supports suspension during a multi-plane write procedure in accordance with examples as disclosed herein. The process flow 500 may be implemented by a host system 505 and a memory system 510 (among other examples), which may be examples of a host system and a memory system described herein. Although various signals are shown being exchanged directly between the host system 505 and the memory system 510, it should be appreciated that signals may be relayed between the host system 505 and the memory system 510 by or through one or more intermediary devices. In general, a signal sent from system A to system B may refer to a signal that originates at system A and terminates at system B, regardless of any intermediate devices used to relay, adapt and transmit, or modify and transmit the signal. In process flow 500, the host system 505 and the memory system 510 may facilitate suspension of one or more defective planes during a multi-plane write procedure.

Aspects of the process flow 500 may be implemented by one or more controllers, among other components. Additionally or alternatively, aspects of the process flow 500 may be implemented as instructions stored in memory (e.g., firmware stored in a memory coupled with one or both of the host system 505 or the memory system 510). For example, the instructions, if executed by a controller (e.g., the host system controller 106, the memory system controller 115, a local controller 135), may cause the controller to perform the operations of the process flow 500.

At 515, the host system 505 may transmit to the memory system 510 data for a multi-plane write procedure. The data may be associated with a plurality of planes. At 520, the host system 505 may transmit to the memory system 510 an indication of a value for a threshold latency for the memory system 510 to use to identify defective memory planes. In some examples, the host system 505 may determine the value based on write latency information received from the memory system 510. For example, the host system 505 may receive from the memory system 510 an indication of respective write latencies for planes of the memory system 510 (or an indication of an average latency or a mean latency) and select the value for the threshold latency based on the write latency information.

At 525, the memory system 510 may select a plurality of planes for the multi-plane write procedure. The memory system 510 may select the plurality of planes based on (e.g., in response to) receipt of the data at 515. At 530, the memory system 510 may write some of the data to the plurality of planes. For example, the memory system 510 may write subsets of data to the planes in parallel.

At 535, the memory system 510 may determine a threshold latency for identifying defective planes. For example, the memory system 510 may read the value for the threshold latency from a local storage component (e.g., a register, a memory array, a latch). The value may be the value indicated by the host device at 520 or a value determined independently by the memory system 510. In some examples, the value may be based on respective write latencies for planes (e.g., the plurality of planes, or another set of planes) of the memory system 510. The write latency for a plane may be based on the amount of time it takes to successfully write a unit of data (e.g., n subsets of data) to the plane. Additionally or alternatively, the write latency for a plane may be based on the quantity of failed write operations for a unit of data or based on the quantity of repeated write operations needed to write the unit of data.

At 540, the memory system 510 may identify one or more defective planes in the plurality of planes. The memory system 510 may identify the one or more defective planes by comparing the write latency for each plane with the threshold latency. If the write latency for a plane is greater than the threshold latency, the memory system 510 may identify the plane as a defective plane. If the write latency for a plane is less than the threshold latency, the memory system 510 may identify the plane as a non-defective plane.

At 545, the memory system 510 may transmit an indication of the defective plane(s) to the host system 505. At 550, the host system 505 may transmit an indication that the memory system 510 is to delay writing subsets of data to the defective plane(s) until after the data for the non-defective planes has been written to the non-defective planes. Put another way, the host system 505 may transmit an indication that the memory system 510 is to suspend write operations to the defective planes until after the data for the non-defective planes has been written to the non-defective planes.

At 555, the memory system 510 may suspend write operations to the defective plane(s) and continue write operations to the non-defective planes. For example, at 560 the memory system 510 may perform write operations on the non-defective planes to write subsets of data for the non-defective planes to the non-defective planes. The memory system 510 may suspend write operations to the defective planes at 555 based on (e.g., in response to) the indication received at 550 or based on (e.g., in response to) identifying the defective planes at 540.

At 565, the memory system 510 may determine that the subsets of data for the non-defective planes have been written to the non-defective planes (e.g., the memory system 510 may determine that all the data for the non-defective planes has been written to the non-defective planes). Accordingly, at 570, the memory system 510 may transmit to the host system 505 an indication that the data for the non-defective planes has been written to the non-defective planes at 565 (e.g., the memory system 510 may indicate that writing to the non-defective planes has finished).

At 575, the memory system 510 may lift the suspension of the defective memory plane(s) and write the remaining data for the defective memory planes to the defective memory planes, where the remaining data may refer to the subsets of data for the defective memory planes minus the subsets of data for the defective plane(s) that were already written to the defective memory planes at 530. At 580, the memory system 510 may transmit to the host system 505 an indication that the data for the defective planes has been written to the defective plane(s) (e.g., the memory system 510 may indicate that writing to the defective plane(s) has finished).

Thus, the host system 505 and the memory system 510 may facilitate suspension of one or more defective planes during a multi-plane write procedure.

Figure 6:
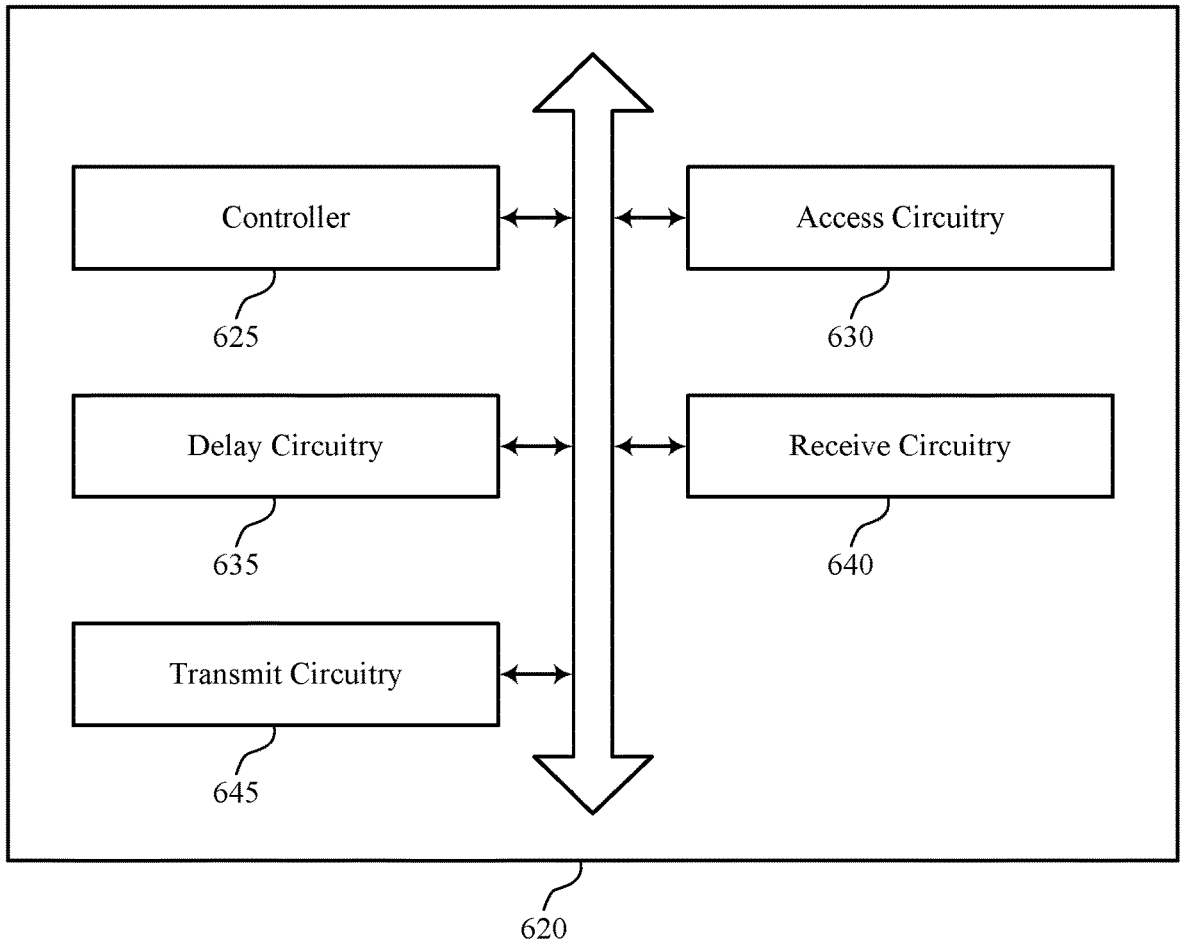
FIG. 6 shows a block diagram of a memory system that supports suspension during a multi-plane write procedure in accordance with examples as disclosed herein.

FIG. 6 shows a block diagram 600 of a memory system 620 that supports suspension during a multi-plane write procedure in accordance with examples as disclosed herein. The memory system 620 may be an example of aspects of a memory system as described with reference to FIGS. 1 through 5. The memory system 620, or various components thereof, may be an example of means for performing various aspects of suspension during a multi-plane write procedure as described herein. For example, the memory system 620 may include a controller 625, an access circuitry 630, a delay circuitry 635, a receive circuitry 640, a transmit circuitry 645, or any combination thereof. Each of these components may communicate, directly or indirectly, with one another (e.g., via one or more buses).

The controller 625 may be configured as or otherwise support a means for selecting a plurality of planes of a memory device for writing data. In some examples, the controller 625 may be configured as or otherwise support a means for determining that a latency for writing a first subset of the data to a first plane of the plurality of planes is greater than a threshold latency. The access circuitry 630 may be configured as or otherwise support a means for writing, based at least in part on the latency being greater than the threshold latency, a remainder of the data to a remainder of the plurality of planes, the remainder excluding the first subset of the data and a second subset of the data for the first plane. The delay circuitry 635 may be configured as or otherwise support a means for delaying, based at least in part on the latency being greater than the threshold latency, writing the second subset of the data to the first plane until the remainder of the data is written to the remainder of the plurality of planes.

In some examples, the first subset of the data is written to the first plane concurrent with writing other subsets of the data to the remainder of the plurality of planes. In some examples, the remainder of the data excludes the other subsets.

In some examples, the controller 625 may be configured as or otherwise support a means for determining that a second latency for writing a third subset of the data to a second plane of the plurality of planes is greater than the threshold latency. In some examples, the delay circuitry 635 may be configured as or otherwise support a means for delaying writing a fourth subset of the data to the second plane until the remainder of the data is written to the remainder of the plurality of planes, where the remainder of the data excludes the third and fourth subsets of the data, and where the remainder of the plurality of planes excludes the second plane.

In some examples, the access circuitry 630 may be configured as or otherwise support a means for writing the second subset of the data to the first plane concurrent with writing the third subset of the data to the second plane and after writing the remainder of the data to the remainder of the plurality of planes.

In some examples, the access circuitry 630 may be configured as or otherwise support a means for writing the second subset of the data to the first plane after writing the remainder of the data to the remainder of the plurality of planes. In some examples, the controller 625 may be configured as or otherwise support a means for determining that the second latency is greater than the latency. In some examples, the delay circuitry 635 may be configured as or otherwise support a means for delaying writing the fourth subset of the data until after writing the second subset of the data to the first plane.

In some examples, the controller 625 may be configured as or otherwise support a means for determining that each plane of the remainder of the plurality of planes has a latency for writing that is less than the threshold latency, where the remainder of the data is written to the remainder of the plurality of planes based at least in part on determining that each plane of the remainder of the plurality of planes has the latency for writing that is less than the threshold latency.

In some examples, the receive circuitry 640 may be configured as or otherwise support a means for receiving, from a host system, the data for writing to the memory device. In some examples, the transmit circuitry 645 may be configured as or otherwise support a means for transmitting, to the host system, an indication that the latency for writing the first subset of the data to the first plane is greater than the threshold latency. In some examples, the receive circuitry 640 may be configured as or otherwise support a means for receiving, from the host system, an indication to delay writing the second subset of the data to the first plane based at least in part on the indication that the latency for writing the first subset of the data to the first plane is greater than the threshold latency.

In some examples, the transmit circuitry 645 may be configured as or otherwise support a means for transmitting an indication that the remainder of the data has been written to the remainder of the planes based at least in part on writing the remainder of the data to the remainder of the planes. In some examples, the transmit circuitry 645 may be configured as or otherwise support a means for transmitting, after transmitting the indication that the remainder of the data has been written to the remainder of the planes, an indication that the first and second subsets of the data have been written to the first plane based at least in part on writing the first and second subsets of the data to the first plane.

In some examples, the controller 625 may be configured as or otherwise support a means for determining a quantity of failed write operations for writing the first subset of the data to the first plane, where the latency is determined based at least in part on the quantity.

In some examples, the threshold latency further includes a preconfigured latency or a latency that is determined based at least in part on one or more respective latencies for writing to the remainder of the plurality of planes.

Figure 7:
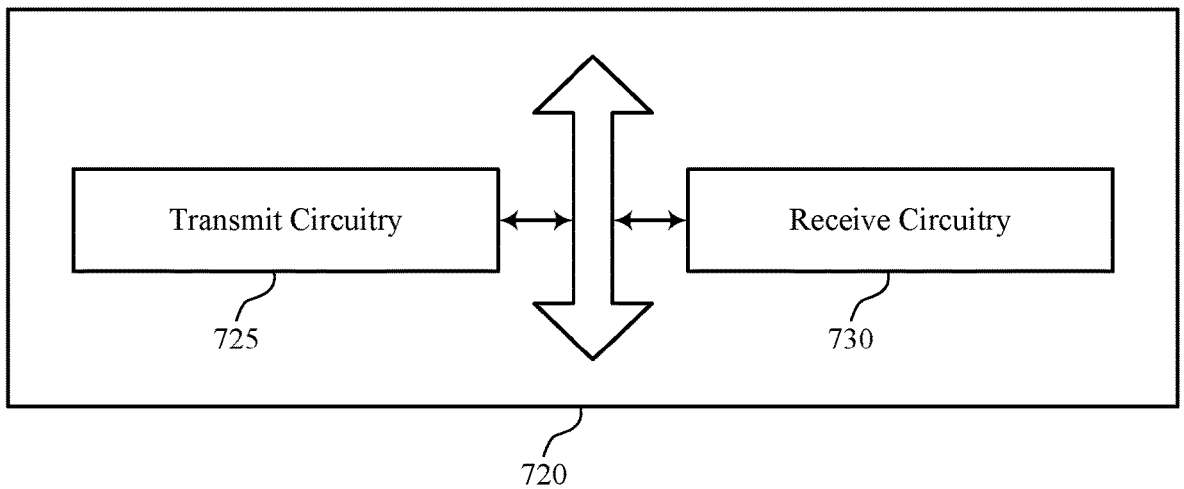
FIG. 7 shows a block diagram of a host system that supports suspension during a multi-plane write procedure in accordance with examples as disclosed herein.

FIG. 7 shows a block diagram 700 of a host system 720 that supports suspension during a multi-plane write procedure in accordance with examples as disclosed herein. The host system 720 may be an example of aspects of a host system as described with reference to FIGS. 1 through 5. The host system 720, or various components thereof, may be an example of means for performing various aspects of suspension during a multi-plane write procedure as described herein. For example, the host system 720 may include a transmit circuitry 725 a receive circuitry 730, or any combination thereof. Each of these components may communicate, directly or indirectly, with one another (e.g., via one or more buses).

The transmit circuitry 725 may be configured as or otherwise support a means for transmitting data for writing to a memory device of a memory system, the data associated with a plurality of planes of the memory device. The receive circuitry 730 may be configured as or otherwise support a means for receiving an indication that a first plane of the plurality of planes has a latency for writing a first subset of the data that is greater than a threshold latency. In some examples, the transmit circuitry 725 may be configured as or otherwise support a means for transmitting an indication that the memory device is to delay writing a second subset of the data to the first plane until a remainder of the data is written to a remainder of the plurality of planes, where the remainder of the data excludes the first and second subsets of the data, and where the remainder of the plurality of planes excludes the first plane.

In some examples, the receive circuitry 730 may be configured as or otherwise support a means for receiving, based at least in part on transmitting the indication that the memory device is to delay writing the second subset of the data, an indication that the remainder of the data has been written to the remainder of the plurality of planes.

In some examples, the receive circuitry 730 may be configured as or otherwise support a means for receiving, after receiving the indication that the remainder of the data has been written to the remainder of the plurality of planes, an indication that the first and second subsets of the data have been written to the first plane.

In some examples, the receive circuitry 730 may be configured as or otherwise support a means for receiving an indication that a second plane of the plurality of planes has a second latency for writing a third subset of the data that is greater than the threshold latency. In some examples, the transmit circuitry 725 may be configured as or otherwise support a means for transmitting an indication that the memory device is to delay writing a fourth subset of the data to the second plane until the remainder of the data is written to the remainder of the plurality of planes, where the remainder of the data excludes the third and fourth subsets of the data, and where the remainder of the plurality of planes excludes the second plane.

In some examples, the receive circuitry 730 may be configured as or otherwise support a means for receiving an indication that a second plane of the plurality of planes has a second latency for writing a third subset of the data that is greater than the latency. In some examples, the transmit circuitry 725 may be configured as or otherwise support a means for transmitting an indication that the memory device is to delay writing a fourth subset of the data to the second plane until the second subset of the data is written to the first plane.

Figure 8:
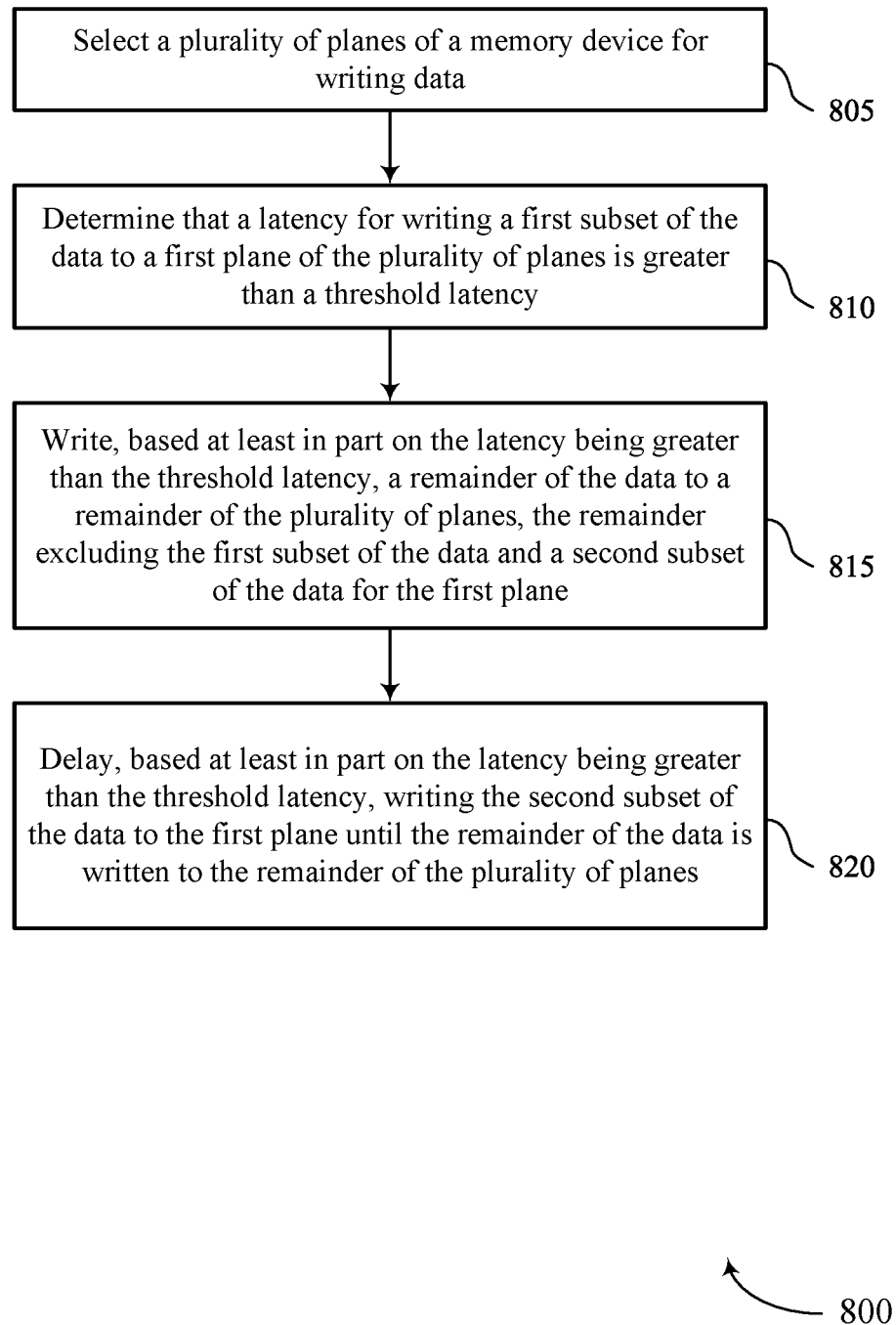
FIGS. 8 and 9 show flowcharts illustrating a method or methods that support suspension during a multi-plane write procedure in accordance with examples as disclosed herein.

FIG. 8 shows a flowchart illustrating a method 800 that supports suspension during a multi-plane write procedure in accordance with examples as disclosed herein. The operations of method 800 may be implemented by a memory system or its components as described herein. For example, the operations of method 800 may be performed by a memory system as described with reference to FIGS. 1 through 6. In some examples, a memory system may execute a set of instructions to control the functional elements of the device to perform the described functions. Additionally or alternatively, the memory system may perform aspects of the described functions using special-purpose hardware.

At 805, the method may include selecting a plurality of planes of a memory device for writing data. The operations of 805 may be performed in accordance with examples as disclosed herein. In some examples, aspects of the operations of 805 may be performed by a controller 625 as described with reference to FIG. 6.

At 810, the method may include determining that a latency for writing a first subset of the data to a first plane of the plurality of planes is greater than a threshold latency. The operations of 810 may be performed in accordance with examples as disclosed herein. In some examples, aspects of the operations of 810 may be performed by a controller 625 as described with reference to FIG. 6.

At 815, the method may include writing, based at least in part on the latency being greater than the threshold latency, a remainder of the data to a remainder of the plurality of planes, the remainder excluding the first subset of the data and a second subset of the data for the first plane. The operations of 815 may be performed in accordance with examples as disclosed herein. In some examples, aspects of the operations of 815 may be performed by an access circuitry 630 as described with reference to FIG. 6.

At 820, the method may include delaying, based at least in part on the latency being greater than the threshold latency, writing the second subset of the data to the first plane until the remainder of the data is written to the remainder of the plurality of planes. The operations of 820 may be performed in accordance with examples as disclosed herein. In some examples, aspects of the operations of 820 may be performed by a delay circuitry 635 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for selecting a plurality of planes of a memory device for writing data; determining that a latency for writing a first subset of the data to a first plane of the plurality of planes is greater than a threshold latency; writing, based at least in part on the latency being greater than the threshold latency, a remainder of the data to a remainder of the plurality of planes, the remainder excluding the first subset of the data and a second subset of the data for the first plane; and delaying, based at least in part on the latency being greater than the threshold latency, writing the second subset of the data to the first plane until the remainder of the data is written to the remainder of the plurality of planes.

Aspect 2: The method, apparatus, or non-transitory computer-readable medium of aspect 1 where the first subset of the data is written to the first plane concurrent with writing other subsets of the data to the remainder of the plurality of planes and the remainder of the data excludes the other subsets.

Aspect 3: The method, apparatus, or non-transitory computer-readable medium of any of aspects 1 through 2, further including operations, features, circuitry, logic, means, or instructions, or any combination thereof for determining that a second latency for writing a third subset of the data to a second plane of the plurality of planes is greater than the threshold latency and delaying writing a fourth subset of the data to the second plane until the remainder of the data is written to the remainder of the plurality of planes, where the remainder of the data excludes the third and fourth subsets of the data, and where the remainder of the plurality of planes excludes the second plane.

Aspect 4: The method, apparatus, or non-transitory computer-readable medium of aspect 3, further including operations, features, circuitry, logic, means, or instructions, or any combination thereof for writing the second subset of the data to the first plane concurrent with writing the third subset of the data to the second plane and after writing the remainder of the data to the remainder of the plurality of planes.

Aspect 5: The method, apparatus, or non-transitory computer-readable medium of any of aspects 3 through 4, further including operations, features, circuitry, logic, means, or instructions, or any combination thereof for writing the second subset of the data to the first plane after writing the remainder of the data to the remainder of the plurality of planes; determining that the second latency is greater than the latency; and delaying writing the fourth subset of the data until after writing the second subset of the data to the first plane.

Aspect 6: The method, apparatus, or non-transitory computer-readable medium of any of aspects 1 through 5, further including operations, features, circuitry, logic, means, or instructions, or any combination thereof for determining that each plane of the remainder of the plurality of planes has a latency for writing that is less than the threshold latency, where the remainder of the data is written to the remainder of the plurality of planes based at least in part on determining that each plane of the remainder of the plurality of planes has the latency for writing that is less than the threshold latency.

Aspect 7: The method, apparatus, or non-transitory computer-readable medium of any of aspects 1 through 6, further including operations, features, circuitry, logic, means, or instructions, or any combination thereof for receiving, from a host system, the data for writing to the memory device; transmitting, to the host system, an indication that the latency for writing the first subset of the data to the first plane is greater than the threshold latency; and receiving, from the host system, an indication to delay writing the second subset of the data to the first plane based at least in part on the indication that the latency for writing the first subset of the data to the first plane is greater than the threshold latency.

Aspect 8: The method, apparatus, or non-transitory computer-readable medium of any of aspects 1 through 7, further including operations, features, circuitry, logic, means, or instructions, or any combination thereof for transmitting an indication that the remainder of the data has been written to the remainder of the planes based at least in part on writing the remainder of the data to the remainder of the planes and transmitting, after transmitting the indication that the remainder of the data has been written to the remainder of the planes, an indication that the first and second subsets of the data have been written to the first plane based at least in part on writing the first and second subsets of the data to the first plane.

Aspect 9: The method, apparatus, or non-transitory computer-readable medium of any of aspects 1 through 8, further including operations, features, circuitry, logic, means, or instructions, or any combination thereof for determining a quantity of failed write operations for writing the first subset of the data to the first plane, where the latency is determined based at least in part on the quantity.

Aspect 10: The method, apparatus, or non-transitory computer-readable medium of any of aspects 1 through 9 where the threshold latency further includes a preconfigured latency or a latency that is determined based at least in part on one or more respective latencies for writing to the remainder of the plurality of planes.

Figure 9:
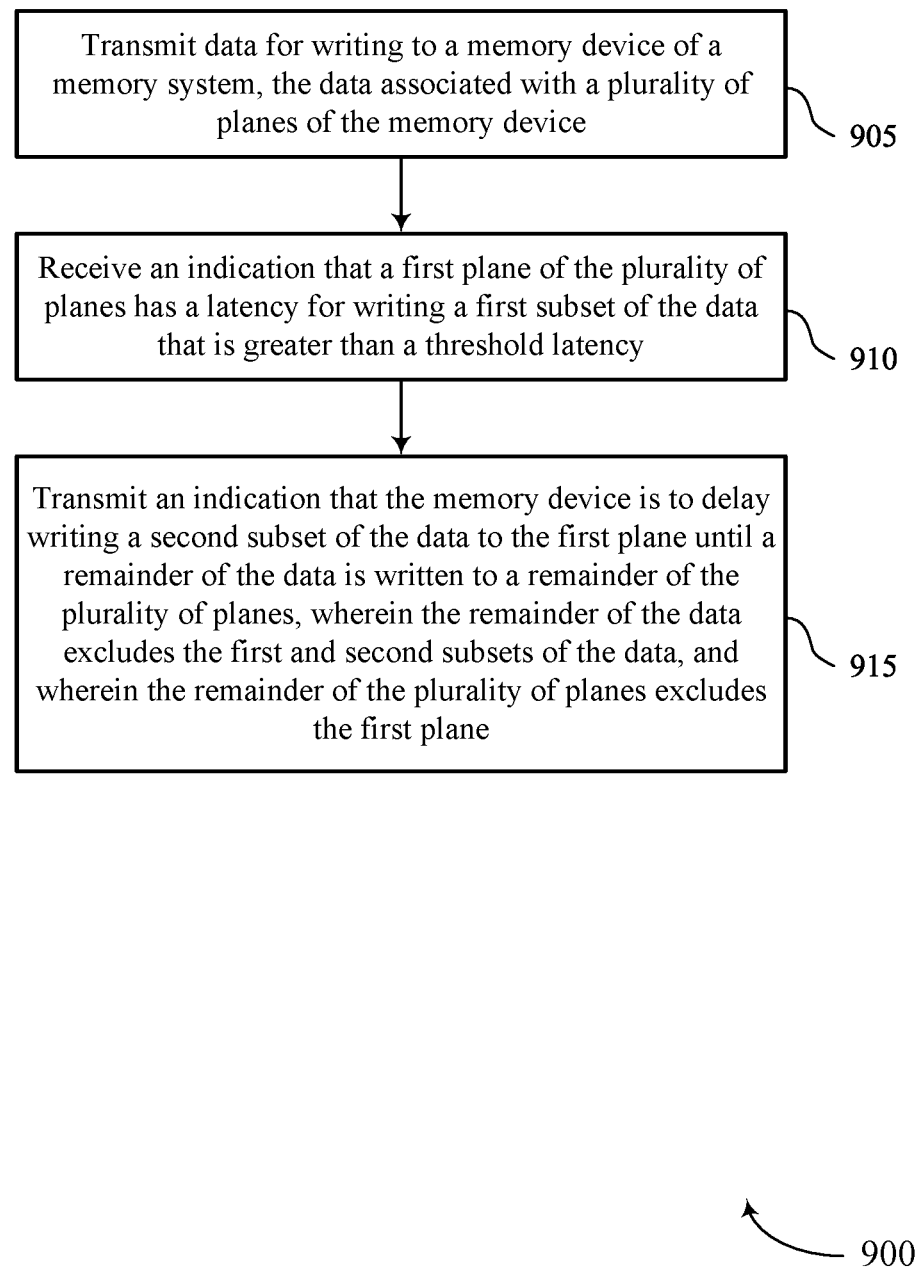

FIG. 9 shows a flowchart illustrating a method 900 that supports suspension during a multi-plane write procedure in accordance with examples as disclosed herein. The operations of method 900 may be implemented by a host system or its components as described herein. For example, the operations of method 900 may be performed by a host system as described with reference to FIGS. 1 through 5 and 7. In some examples, a host system may execute a set of instructions to control the functional elements of the device to perform the described functions. Additionally or alternatively, the host system may perform aspects of the described functions using special-purpose hardware.

At 905, the method may include transmitting data for writing to a memory device of a memory system, the data associated with a plurality of planes of the memory device. The operations of 905 may be performed in accordance with examples as disclosed herein. In some examples, aspects of the operations of 905 may be performed by a transmit circuitry 725 as described with reference to FIG. 7.

At 910, the method may include receiving an indication that a first plane of the plurality of planes has a latency for writing a first subset of the data that is greater than a threshold latency. The operations of 910 may be performed in accordance with examples as disclosed herein. In some examples, aspects of the operations of 910 may be performed by a receive circuitry 730 as described with reference to FIG. 7.

At 915, the method may include transmitting an indication that the memory device is to delay writing a second subset of the data to the first plane until a remainder of the data is written to a remainder of the plurality of planes, where the remainder of the data excludes the first and second subsets of the data, and where the remainder of the plurality of planes excludes the first plane. The operations of 915 may be performed in accordance with examples as disclosed herein. In some examples, aspects of the operations of 915 may be performed by a transmit circuitry 725 as described with reference to FIG. 7.

In some examples, an apparatus as described herein may perform a method or methods, such as the method 900. The apparatus may include features, circuitry, logic, means, or instructions (e.g., a non-transitory computer-readable medium storing instructions executable by a processor), or any combination thereof for performing the following aspects of the present disclosure:

Aspect 11: A method, apparatus, or non-transitory computer-readable medium including operations, features, circuitry, logic, means, or instructions, or any combination thereof for transmitting data for writing to a memory device of a memory system, the data associated with a plurality of planes of the memory device; receiving an indication that a first plane of the plurality of planes has a latency for writing a first subset of the data that is greater than a threshold latency; and transmitting an indication that the memory device is to delay writing a second subset of the data to the first plane until a remainder of the data is written to a remainder of the plurality of planes, where the remainder of the data excludes the first and second subsets of the data, and where the remainder of the plurality of planes excludes the first plane.

Aspect 12: The method, apparatus, or non-transitory computer-readable medium of aspect 11, further including operations, features, circuitry, logic, means, or instructions, or any combination thereof for receiving, based at least in part on transmitting the indication that the memory device is to delay writing the second subset of the data, an indication that the remainder of the data has been written to the remainder of the plurality of planes.

Aspect 13: The method, apparatus, or non-transitory computer-readable medium of aspect 12, further including operations, features, circuitry, logic, means, or instructions, or any combination thereof for receiving, after receiving the indication that the remainder of the data has been written to the remainder of the plurality of planes, an indication that the first and second subsets of the data have been written to the first plane.

Aspect 14: The method, apparatus, or non-transitory computer-readable medium of any of aspects 11 through 13, further including operations, features, circuitry, logic, means, or instructions, or any combination thereof for receiving an indication that a second plane of the plurality of planes has a second latency for writing a third subset of the data that is greater than the threshold latency and transmitting an indication that the memory device is to delay writing a fourth subset of the data to the second plane until the remainder of the data is written to the remainder of the plurality of planes, where the remainder of the data excludes the third and fourth subsets of the data, and where the remainder of the plurality of planes excludes the second plane.

Aspect 15: The method, apparatus, or non-transitory computer-readable medium of any of aspects 11 through 14, further including operations, features, circuitry, logic, means, or instructions, or any combination thereof for receiving an indication that a second plane of the plurality of planes has a second latency for writing a third subset of the data that is greater than the latency and transmitting an indication that the memory device is to delay writing a fourth subset of the data to the second plane until the second subset of the data is written to the first plane.

It should be noted that the methods described above describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 16: An apparatus, including: a memory device; and a controller coupled with the memory device and configured to cause the apparatus to: select a plurality of planes of the memory device for writing data; determine that a latency for writing a first subset of the data to a first plane of the plurality of planes is greater than a threshold latency; write, based at least in part on the latency being greater than the threshold latency, a remainder of the data to a remainder of the plurality of planes, the remainder excluding the first subset of the data and a second subset of the data for the first plane; and delay, based at least in part on the latency being greater than the threshold latency, writing the second subset of the data to the first plane until the remainder of the data is written to the remainder of the plurality of planes.

Aspect 17: The apparatus of aspect 16, where the first subset of the data is written to the first plane concurrent with writing other subsets of the data to the remainder of the plurality of planes, the remainder of the data excludes the other subsets.

Aspect 18: The apparatus of any of aspects 16 through 17, where the controller is further configured to cause the apparatus to: determine that a second latency for writing a third subset of the data to a second plane of the plurality of planes is greater than the threshold latency; and delay writing a fourth subset of the data to the second plane until the remainder of the data is written to the remainder of the plurality of planes, where the remainder of the data excludes the third and fourth subsets of the data, and where the remainder of the plurality of planes excludes the second plane.

Aspect 19: The apparatus of aspect 18, where the controller is further configured to cause the apparatus to: write the second subset of the data to the first plane concurrent with writing the third subset of the data to the second plane and after writing the remainder of the data to the remainder of the plurality of planes.

Aspect 20: The apparatus of any of aspects 18 through 19, where the controller is further configured to cause the apparatus to: write the second subset of the data to the first plane after writing the remainder of the data to the remainder of the plurality of planes; and delay, based at least in part on the second latency being greater than the latency, writing the fourth subset of the data until after writing the second subset of the data to the first plane.

Aspect 21: The apparatus of any of aspects 16 through 20, where the controller is further configured to cause the apparatus to: determine that each plane of the remainder of the plurality of planes has a latency for writing that is less than the threshold latency, where the remainder of the data is written to the remainder of the plurality of planes based at least in part on determining that each plane of the remainder of the plurality of planes has the latency for writing that is less than the threshold latency.

Aspect 22: The apparatus of any of aspects 16 through 21, where the controller is further configured to cause the apparatus to: receive, from a host system, the data for writing to the memory device; transmit, to the host system, an indication that the latency for writing the first subset of the data to the first plane is greater than the threshold latency; and receive, from the host system, an indication to delay writing the second subset of the data to the first plane based at least in part on the indication that the latency for writing the first subset of the data to the first plane is greater than the threshold latency.

Aspect 23: The apparatus of any of aspects 16 through 22, where the controller is further configured to cause the apparatus to: transmit an indication that the remainder of the data has been written to the remainder of the planes based at least in part on writing the remainder of the data to the remainder of the planes; and transmit, after transmitting the indication that the remainder of the data has been written to the remainder of the planes, an indication that the first and second subsets of the data have been written to the first plane based at least in part on writing the first and second subsets of the data to the first plane.

Aspect 24: The apparatus of any of aspects 16 through 23, where the controller is further configured to cause the apparatus to: determine a quantity of failed write operations for writing the first subset of the data to the first plane, where the latency is determined based at least in part on the quantity.

Aspect 25: The apparatus of any of aspects 16 through 24, where the threshold latency includes a preconfigured latency or a latency that is determined based at least in part on one or more respective latencies for writing to the remainder of the plurality of planes.

An apparatus is described. The following provides an overview of aspects of the apparatus as described herein:

Aspect 26: An apparatus, including: a controller configured to couple with a memory system, where the controller is configured to cause the apparatus to: transmit data for writing to a memory device of the memory system, the data associated with a plurality of planes of the memory device; receive an indication that a first plane of the plurality of planes has a latency for writing a first subset of the data that is greater than a threshold latency; and transmit an indication that the memory device is to delay writing a second subset of the data to the first plane until a remainder of the data is written to a remainder of the plurality of planes, where the remainder of the data excludes the first and second subsets of the data, and where the remainder of the plurality of planes excludes the first plane.

Aspect 27: The apparatus of aspect 26, where the controller is further configured to cause the apparatus to: receive, based at least in part on transmitting the indication that the memory device is to delay writing the second subset of the data, an indication that the remainder of the data has been written to the remainder of the plurality of planes.

Aspect 28: The apparatus of aspect 27, where the controller is further configured to cause the apparatus to: receive, after receiving the indication that the remainder of the data has been written to the remainder of the plurality of planes, an indication that the first and second subsets of the data have been written to the first plane.

Aspect 29: The apparatus of any of aspects 26 through 28, where the controller is further configured to cause the apparatus to: receive an indication that a second plane of the plurality of planes has a second latency for writing a third subset of the data that is greater than the threshold latency; and transmit an indication that the memory device is to delay writing a fourth subset of the data to the second plane until the remainder of the data is written to the remainder of the plurality of planes, where the remainder of the data excludes the third and fourth subsets of the data, and where the remainder of the plurality of planes excludes the second plane.

Aspect 30: The apparatus of any of aspects 26 through 29, where the controller is further configured to cause the apparatus to: receive an indication that a second plane of the plurality of planes has a second latency for writing a third subset of the data that is greater than the latency; and transmit an indication that the memory device is to delay writing a fourth subset of the data to the second plane until the second subset of the data is written to the first plane.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising: one or more memory devices; and one or more memory controllers coupled with the one or more memory devices, the one or more memory controllers configured to cause the apparatus to: determine, during a multi-plane write procedure for writing data to a set of planes, that a first plane of the set of planes is defective; write, based at least in part on the first plane being defective, a remainder of the data to one or more of a remainder of the set of planes that excludes the first plane, the remainder of the data excluding a first subset of the data; and delay, based at least in part on the first plane being defective, writing the first subset of the data to the first plane until the remainder of the data is written to the one or more of the remainder of the set of planes.

2. The apparatus of claim 1, wherein the one or more memory controllers are further configured to cause the apparatus to: determine that a latency associated with writing a second subset of the data to the first plane satisfies a threshold, wherein the first plane is determined to be defective based at least in part on determining that the latency satisfies the threshold.

3. The apparatus of claim 1, wherein the one or more memory controllers are further configured to cause the apparatus to: determine that a threshold quantity of failed write operations for writing the first subset of the data to the first plane have occurred, wherein the first plane is determined to be defective based at least in part on determining that the threshold quantity of failed write operations have been performed.

4. The apparatus of claim 1, wherein concurrent write operations are performed on the one or more of the remainder of the set of planes to write the remainder of the data to the one or more of the remainder of the set of planes.

5. The apparatus of claim 1, wherein the one or more memory controllers are further configured to cause the apparatus to: write, before determining that the first plane is defective, a second subset of the data to the first plane concurrent with writing other subsets of the data to the one or more of the remainder of the set of planes.

6. The apparatus of claim 1, wherein the one or more memory controllers are further configured to cause the apparatus to: determine, during the multi-plane write procedure, that a second plane of the set of planes is defective; and delay, based at least in part on the second plane being defective, writing a second subset of the data to the second plane until the remainder of the data is written to the one or more of the remainder of the set of planes, wherein the remainder of the data excludes the second subset and the one or more of the remainder of the set of planes excludes the second plane.

7. The apparatus of claim 6, wherein the one or more memory controllers are further configured to cause the apparatus to: write the first subset of the data to the first plane concurrent with writing the second subset of the data to the second plane.

8. The apparatus of claim 6, wherein the one or more memory controllers are further configured to cause the apparatus to: delay writing the second subset of the data to the second plane until after writing the first subset of the data to the first plane.

9. The apparatus of claim 1, wherein the one or more memory controllers are further configured to cause the apparatus to: determine that none of the remainder of the set of planes are defective, wherein the remainder of the data is written to the remainder of the set of planes based at least in part on determining that none of the remainder of the set of planes are defective.

10. The apparatus of claim 1, wherein the one or more memory controllers are further configured to cause the apparatus to: receive, from a host system, the data for writing to the one or more memory devices; transmit, to the host system, an indication that a latency for writing a second subset of the data to the first plane is greater than a threshold latency; and receive, from the host system, an indication to delay writing the first subset of the data to the first plane based at least in part on the indication that the latency for writing the second subset of the data to the first plane is greater than the threshold latency.

11. An apparatus, comprising: one or more memory devices; and one or more memory controllers coupled with the one or more memory devices, the one or more memory controllers configured to cause the apparatus to: determine, during a multi-plane write procedure for writing data to a set of planes, that a first plane and second plane of the set of planes are defective; write, as part of the multi-plane write procedure and based at least in part on determining that the first plane and the second plane are defective, a remainder of the data to one or more of a remainder of planes of the set of planes that excludes the first plane and the second plane, the remainder of the data excluding a first subset of the data and a second subset of the data; and write, concurrently and as part of the multi-plane write procedure, the first subset of the data to the first plane and the second subset of the data to the second plane after a delay that based at least in part on writing the remainder of the data to the one or more of the remainder of the planes.

12. The apparatus of claim 11, wherein the one or more memory controllers are further configured to cause the apparatus to: determine that a first write latency for the first plane and a second write latency for the second plane each satisfy a first threshold, wherein the first plane and the second plane are determined to be defective based at least in part on determining that the first write latency for the first plane and the second write latency for the second plane each satisfy the first threshold.

13. The apparatus of claim 12, wherein the one or more memory controllers are further configured to cause the apparatus to: determine that the first write latency for the first plane and the second write latency for the second plane each fail to satisfy a second threshold that is greater than the first threshold, wherein the first subset of the data is written to the first plane concurrently with writing the second subset of the data to the second plane based at least in part on the first write latency for the first plane and the second write latency for the second plane each failing to satisfy the second threshold.

14. The apparatus of claim 11, wherein the one or more memory controllers are further configured to cause the apparatus to: determine that a first quantity of failed write operations for writing the first subset of the data to the first plane satisfies a threshold quantity, wherein the first plane is determined to be defective based at least in part on determining that the first quantity of failed write operations satisfies the threshold quantity; and determine that a second quantity of failed write operations for writing the second subset of the data to the second plane satisfies the threshold quantity, wherein the second plane is determined to be defective based at least in part on determining that the second quantity of failed write operations satisfies the threshold quantity.

15. The apparatus of claim 11, wherein the one or more memory controllers are further configured to cause the apparatus to: write, before determining that the first plane is defective, a third subset of the data to the first plane concurrent with writing other subsets of the data to the one or more of the remainder of the set of planes; and write, before determining that the second plane is defective, a fourth subset of the data to the second plane concurrent with writing the other subsets of the data to the remainder of the set of planes.

16. An apparatus, comprising: one or more memory devices; and one or more memory controllers coupled with the one or more memory devices, the one or more memory controllers configured to cause the apparatus to: determine, during a multi-plane write procedure for writing data to a set of planes, that a first plane and second plane of the set of planes are defective; write, as part of the multi-plane write procedure and based at least in part on determining that the first plane and the second plane are defective, a remainder of the data to the one or more of a remainder of planes of the set of planes that excludes the first plane and the second plane, the remainder of the data excluding a first subset of the data and a second subset of the data; write, as part of the multi-plane write procedure, the first subset of the data to the first plane after a delay that based at least in part on writing the remainder of the data to the one or more of the remainder of the set of planes; and write, as part of the multi-plane write procedure, the second subset of the data to the second plane after a delay that based at least in part on writing the first subset of the data to the first plane.

17. The apparatus of claim 16, wherein the one or more memory controllers are further configured to cause the apparatus to: determine that a first write latency for the first plane and a second write latency for the second plane each satisfy a first threshold, wherein the first plane and the second plane are determined to be defective based at least in part on determining that the first write latency for the first plane and the second write latency for the second plane each satisfy the first threshold.

18. The apparatus of claim 17, wherein the one or more memory controllers are further configured to cause the apparatus to: determine that the first write latency for the first plane and the second write latency for the second plane each satisfy a second threshold that is greater than the first threshold, wherein the second subset of the data is written to the second plane after writing the first subset of the data to the first plane based at least in part on the first write latency for the first plane and the second write latency for the second plane each satisfying the second threshold.

19. The apparatus of claim 16, wherein the one or more memory controllers are further configured to cause the apparatus to: determine that a first quantity of failed write operations for writing the first subset of the data to the first plane satisfies a threshold quantity, wherein the first plane is determined to be defective based at least in part on determining that the first quantity of failed write operations satisfies the threshold quantity; and determine that a second quantity of failed write operations for writing the second subset of the data to the second plane satisfies the threshold quantity, wherein the second plane is determined to be defective based at least in part on determining that the second quantity of failed write operations satisfies the threshold quantity.

20. The apparatus of claim 16, wherein the one or more memory controllers are further configured to cause the apparatus to: write, before determining that the first plane is defective, a third subset of the data to the first plane concurrent with writing other subsets of the data to the one or more of the remainder of the set of planes; and write, before determining that the second plane is defective, a fourth subset of the data to the second plane concurrent with writing the other subsets of the data to the one or more of the remainder of the set of planes.

* * * * *